United States Patent [19]

Alpers

[11] 4,236,159
[45] Nov. 25, 1980

[54] PASSIVE DIRECTION FINDING SYSTEM

[75] Inventor: Frederick C. Alpers, Riverside, Calif.

[73] Assignee: The United States of America as represented by the Secretary of the Navy, Washington, D.C.

[21] Appl. No.: 546,467

[22] Filed: Feb. 3, 1975

[51] Int. Cl.³ .............................................. G01S 3/02
[52] U.S. Cl. ........................... 343/113 R; 343/100 CL
[58] Field of Search .......................... 343/113, 100 CL

[56] References Cited

U.S. PATENT DOCUMENTS 3,878,381 4/1975 Broder et al. .................... 343/113 R Primary Examiner—Malcolm F. Hubler
Attorney, Agent, or Firm—R. S. Sciascia; W. Thom Skeer; Roy Miller

[57] ABSTRACT

A passive direction finding system incorporating at least one set of spaced-apart antennas, the incoming signal at one antenna being coupled through a delay line having a multiplicity of taps thereon, a plurality of channels equal in number to the number of delay taps and signal processing means coupled to the output of said channels, a reference channel coupled to the output of the other antenna, phase shifting means for varying the phase of the reference channel signal, a frequency modulated oscillator which provides an output signal that is beat against the outputs of the delay line and the output of the second antenna, and a correlator coupled to the output of the channels for determining when correlation exists between a signal from the first antenna and the second antenna to indicate direction of an incoming signal with respect to the baseline between the set of antennas.

9 Claims, 8 Drawing Figures (A) RF SIGNALS (B) IF SIGNAL (C) SIGNAL TO CORRELATOR (D) IF SIGNAL IN REFERENCE CHANNEL (E) REFERENCE SIGNAL TO CORRELATOR

PASSIVE DIRECTION FINDING SYSTEM

BACKGROUND OF THE INVENTION

1. Field of the Invention

The present system is intended to provide a means for determining the direction of sources that emit radar or other rapidly modulated ultra-high frequency or microwave signals, and for doing so with moderately high accuracy ($\pm 3°$) without recourse to large antennas or moving parts. Specifically, the system is proposed for use on naval vessels which sometimes must operate under strict emission controls (EMCON) and yet need to know the direction of various enemy ships, aircraft or missiles that are using radar to locate and attack them. Accurate direction finding against most types of enemy jammers is also possible.

2. Description of the Prior Art

Three catagories of direction finding (DF) systems have heretofore been utilized: (a) systems using narrow antenna beams that are scanned to determine the direction in which the incoming signal is the strongest; (b) generally equivalent systems using an antenna null that is scanned to reach a signal minimum; and (c) microwave interferometer systems.

If supplied with an antenna large enough to produce a narrow beam, the systems in category (a) can provide high accuracy and can function with very weak incoming signals; however, in their simple form such systems can function only in one direction at a given instant.

The systems of category (b), on the other hand, can supply reasonably high accuracy with a relatively small antenna, but require fairly strong incoming signals to function near the nulls, and again, are very limited in angle coverage at a given time. [The difference channels of monopulse receivers can be included in the (b) category, while the sum channels of the monopulse receivers relate to the (a) category systems.]

The category (c) systems overcome the common limitation of the other two systems and provide reception from sources anywhere within a wide angular coverage; however, if widely spaced antennas are used in the interferometer system to gain angular accuracy, ambiguities in the bearing data result and considerable complexity must generally be introduced in order to overcome the ambiguities. Also, interferometer systems require knowledge of the incoming signal frequency (or wavelength) to determine an angle off axis, and measurement of said frequency can present a problem, particularly when a plurality of incoming signals are intermixed. This problem also arises if the incoming signals are swept in frequency, as are the pulses of pulse compression ("chirped") radars.

SUMMARY OF THE INVENTION

The system disclosed herein resembles an interferometer system with regard to the type of antenna that is used and the wide angle coverage that is provided. However, it differs in the basic way in which directional information is derived. By the very meaning of the term, interferometers depend upon the in-phase or out-of-phase combining of signals received via two different paths, usually two different antenna elements. In contrast, the present system applies a very rapid frequency modulation to the incoming signal and uses a multichannel line correlator to match signals received over equal lengths of path, where the path lengths then indicate the angle of arrival of the incoming signal. The system therefore equals the wide angle coverage of the interferometer systems, but does not require a measurement of the incoming signal wavelength and avoids encountering an ambiguous output for every 360° change in relative phase of the incoming signal components.

DESCRIPTION OF THE PREFERRED EMBODIMENT

Figure 1:
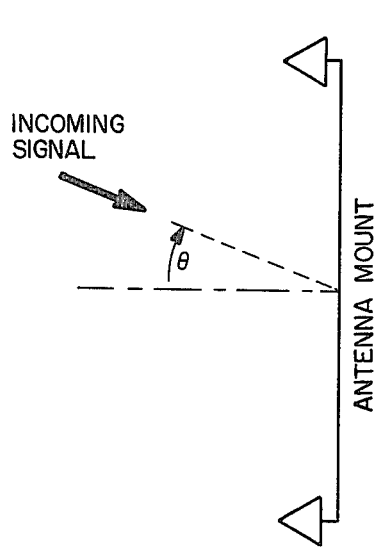
FIG. 1 illustrates the geometry of a two element system.

The basic measurement which the present system is to make is illustrated in FIG. 1 with respect to two spaced-apart antennas. As with an interferometer, the angle of arrival $\theta$, of an incident signal with respect to the axis of a two-element antenna system is to be measured.

Figure 2:
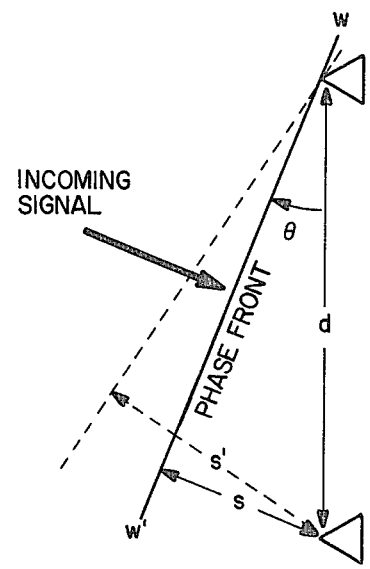
FIG. 2 illustrates the geometries and distances involved with a two-element system.

An equivalent way of defining $\theta$ is illustrated in FIG. 2, along with identifications of certain distances to be used in the explanation of the present invention. FIG. 2 also illustrates the ambiguity problem of a simple interferometric system, which is that another wavefront (e.g. the dotted line of FIG. 2) arriving at an angle other than $\theta$ will yield the same measurement result as $\theta$ whenever s' differs from s by an integral number of wavelengths.

Figure 3:
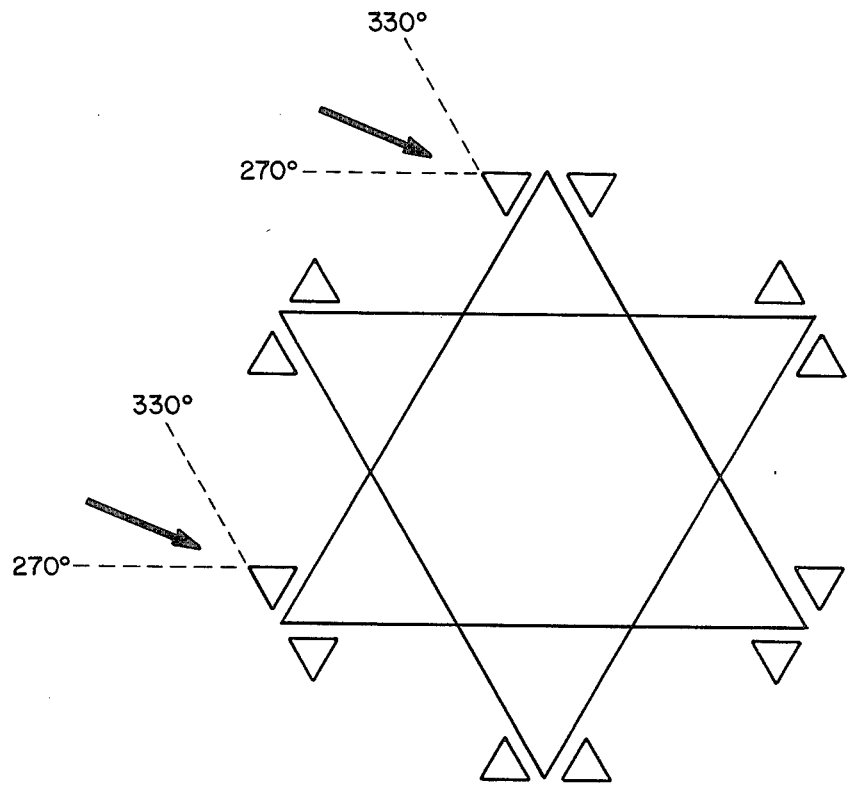
FIG. 3 is a block diagram showing a six-pair combination for 360° coverage.

With a two-element antenna arrangement as shown in FIG. 1, it may be practical to measure $\theta$ through a total angular coverage of $\pm 60°$. To obtain simultaneous coverage through 360°, as is frequently desired in military situations, a number of such pairs of elements could be combined into an overall antenna system. One such arrangement, with six pairs of elements, each covering $\pm 30°$, is illustrated in FIG. 3. In the discussions to follow, only one pair of antennas will be considered in that the additional pairs would be utilized in an identical manner.

Figure 4:
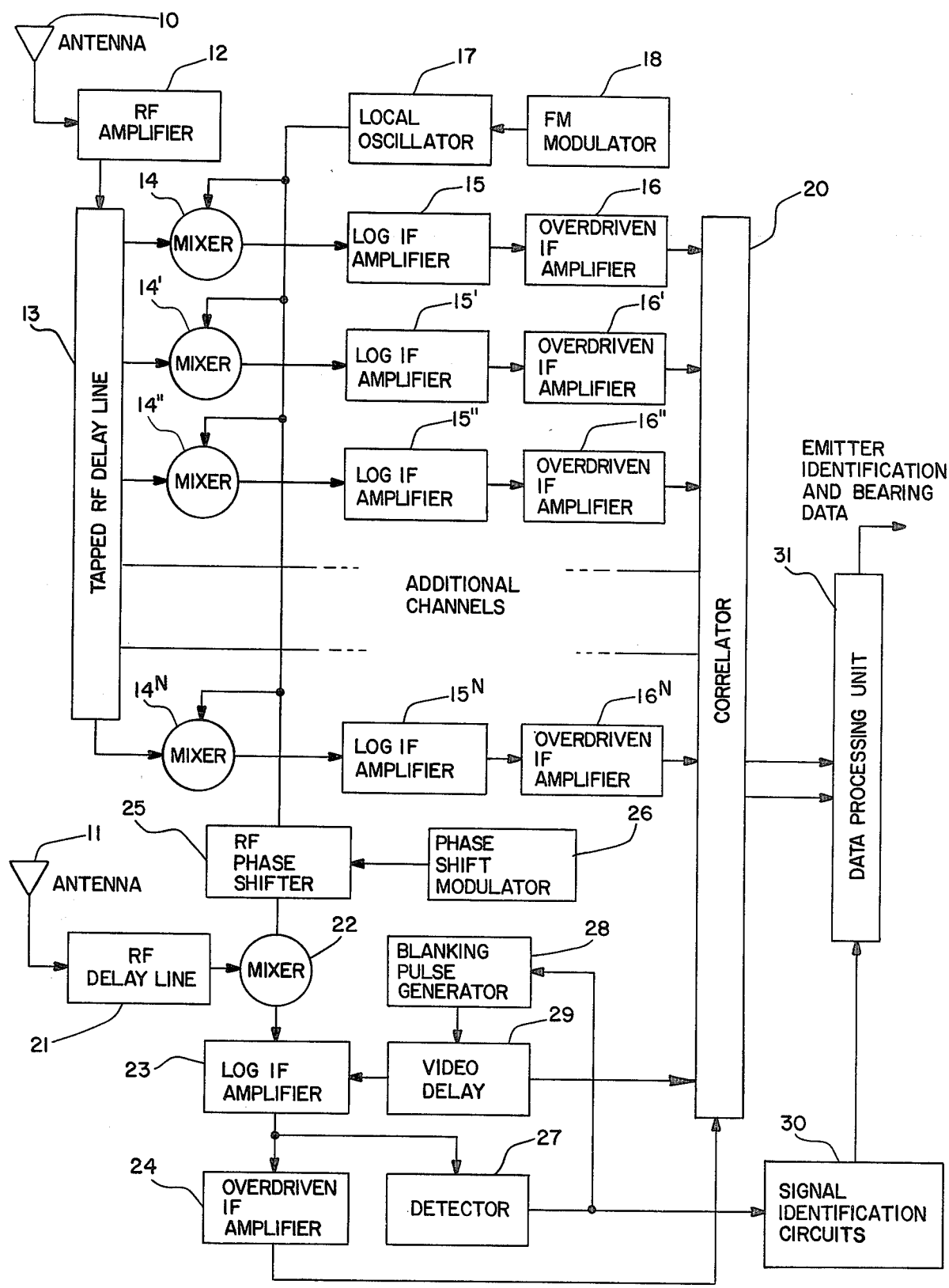
FIG. 4 is a block diagram of one embodiment of the invention.

One embodiment of the present invention is set forth in the block diagram of FIG. 4. In the diagram, a suitably modulated incoming signal, which for the present example will be assumed to be a pulse from an enemy microwave radar, is received on antennas 10 and 11 of a pair arranged as shown in FIG. 1. The signal received on antenna 10 is coupled through an RF amplifier 12 to the input of a tapped RF delay line 13 having a multiplicity of output taps thereon. The delay line 13 might consist of a section of waveguide with sidewall couplers (which can be simply holes) placed at intervals down one side thereof, although a sandwich-type microwave circuit form can be both more broadband and more compact. The couplers will bleed off only a small amount (e.g. $-20$ db) of the signal passing down the line, but losses introduced at this point are made up by the gain of the amplifier 12. The number of such couplers used will typically be ten or more. An approximation of the number required may be obtained by dividing the total angular coverage desired by the angular resolution desired (e.g., an angular coverage of $-30° \leq \theta \leq +30°$ to a resolution of $\pm 3°$ will require ten couplers). The signal at each output tap on the delay line 13 is coupled to a superheterodyne receiver consisting of a crystal mixer 14, logarithmic IF amplifier 15 and overdriven IF amplifier 16. The number of such channels are equivalent in number to the output taps on the delay line 13. Each logarithmic IF amplifier 15 and overdriven IF amplifier 16 may be fabricated as a single very small unit through the use of integrated circuit techniques.

The mixers $14-14^N$ also receive an input from a local oscillator 17 which is FM modulated by an FM modulator 18. The mixers are all heterodyned by the output of the local oscillator 17, which is frequency modulated at an extremely rapid rate. A triangular waveform as shown in FIG. 5 (a) is considered optimum for this modulation but various other waveforms might also be used as applicable.

In each of the mixers $14-14^N$, the oscillator modulation is beat against the incoming signal, which also carries the modulation associated with a pulse or other waveform, and this results in a frequency modulated IF output signal which is coupled to the logarithmic IF amplifier 16 which amplifies and clips the signal so as to form essentially a series of pulses whose pulse widths and spacings vary with the frequency modulation. A diode, not shown, included in amplifier 16 assures that the output pulses are all unidirectional (i.e., of a given polarity with respect to the no-signal baseline).

Figure 5:
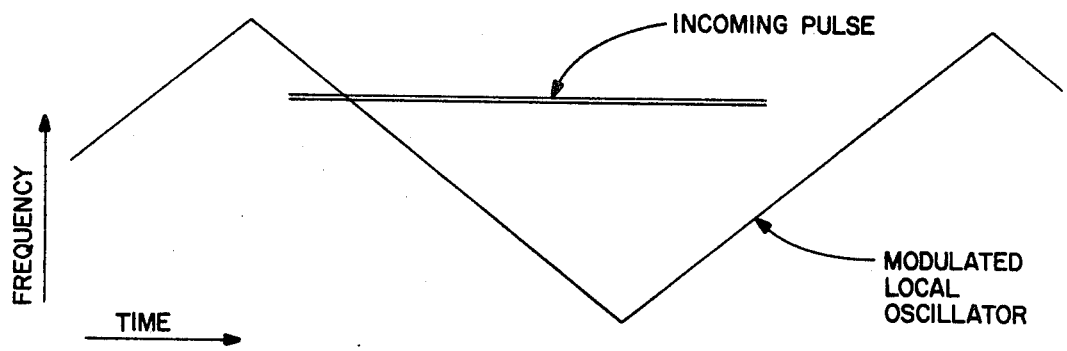
FIG. 5 illustrates wave forms at various points in the system.
Figure 5:
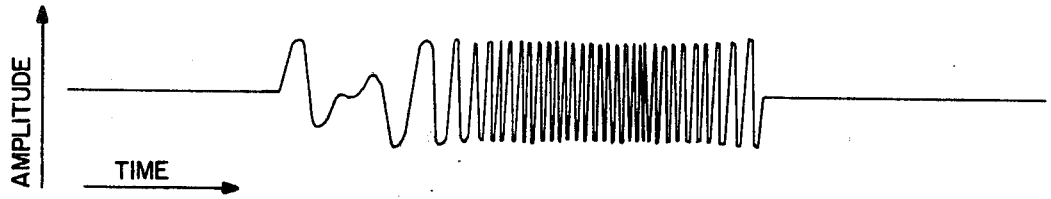
Figure 5:
Figure 5:
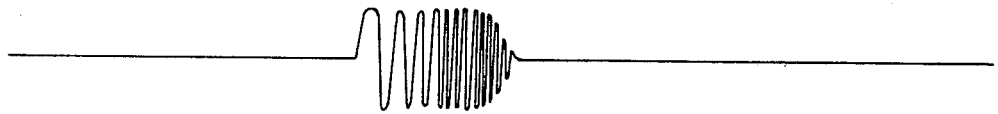
Figure 5:

When the input signal is a nonfrequency-modulated pulse as illustrated in FIG. 5 (a), the IF signal will be a frequency modulated signal with the general appearance shown in FIG. 5 (b), and the output of amplifier 16 will be generally as shown in FIG. 5 (c). When the input signal is frequency modulated, the results will be similar except that, in general, the pattern of the output will be more varied. In either case, the output will change from pulse to pulse because the modulation of the local oscillator is asynchronous with the timing and RF phasing of the incoming pulse.

Referring again to FIG. 4, as the incoming signal travels down the tapped delay line 13 and is coupled to the various mixers $14-14^N$ in succession, it reaches the consecutive mixers with more and more delay with respect to the start of the particular local oscillator modulation cycle then in progress. For this reason, the same input signal will result in different IF signals in the various IF channels and these in turn will result in different patterns of pulses being sent to the correlator 20 by the various IF amplifiers $16-16^N$.

As an example of how much the signal supplied to the correlator 20 by one channel may differ from that supplied by a neighboring channel, consider a situation where the signal delay between one channel and the next due to the tapped delay line 13 is 1.0 nanoseconds (ns) and the local oscillator frequency excursion rate in each direction is 1000 MHz/microsecond ($\mu$s), or 1.0 MHz/ns. The IF frequency difference between signals in adjacent channels is then 1.0 ns $\times$ 1.0 MHz/ns = 1.0 MHz. If it is now further assumed that the incoming signal for this example has a $\frac{1}{2}$ microsecond duration, the 1 MHz "beat" frequency progresses through 180° in phase during the pulse, which means that if the exact phase of the input RF signals in the two channels are such that the IF signals start out in phase at the beginning of the pulse, they will turn out to be completely out of phase at the end of the pulse, or vice versa.

Thus, while signals sent to the correlator 20 from certain adjacent channels might be nearly identical for the first portion of the signal, by the end of the signal there would be short pulses (clippd IF signals) coming from an IF amplifier 16 that would be occurring simultaneously with the gaps between pulses in the neighboring IF amplifier. For non-adjacent channels, the delay difference would be larger and the "beat" frequency higher, and consequently there would be two or more phase reversals observed during the course of a $\frac{1}{2}$ $\mu$s input signal if the outputs to the correlator from the respective channels were compared.

Now consider the signal received at antenna 11. Here the signal is processed through an untapped RF delay line 21, a mixer 22, a logarithmic IF amplifier 23, and an overdriven IF amplifier 24, which together constitute a reference channel for the subject DF system. Referring again to FIG. 1, if the DF system is to process incoming signals from equal angles on either side of the antenna axis (i.e., $\theta$ is to be measured through both positive and negative angles), RF delay line 21 associated with antenna 11 should have a delay equal to $\frac{1}{2}$ that of the tapped line 13, plus a small increment to balance out the inherent delay in the RF amplifier 12.

In FIG. 4, the design of mixer 22, logarithmic IF amplifier 23 and overdriven IF amplifier 24 associated with the reference channel is exactly the same as the mixers, logarithmic IF amplifiers and overdriven IF amplifiers associated with the previously described channels. In addition, the same modulated local oscillator output signal that was coupled to the mixers $14-14^N$ is also coupled to mixer 22, but in this case an RF phase shifter 25 is inserted between oscillator 17 and the mixer to provide an RF phase shift that varies through 360° under control of phase shift modulator 26. Phase shifter 25 may be a ferrite-in-waveguide type in which the amount of phase shift varies with the current in a surrounding coil. In this case, phase shift modulator 26 would be a sawtooth current generator. The RF phase is swept through the stated 360° at a low modulation frequency (e.g., 50 Hz).

Besides serving as an input to amplifier 24, the output of logarithmic IF amplifier 23 is coupled to an IF-to-video detector 27. The resulting video signal serves to trigger a blanking pulse generator 28, which provides a pulse wider than most incoming pulse signals (e.g., 5 $\mu$s). This pulse is fed back to logarithmic IF amplifier 23 via video delay line 29, which introduces a short delay ($\sim$0.1 $\mu$s). After a short further delay, the pulse is also coupled from delay line 29 to correlator 20. The negative feedback to amplifier 23 serves to cut off amplification of incoming signals in the reference channel after only the leading portion of a pulse signal (or a short sample of a continuous jamming signal) has been received. The effect of this blanking of later portions of the signal is illustrated in FIGS. 5(d) and 5(e).

The output of detector 27 is also coupled to signal identification circuits 30, which in turn supply an output to a data processing unit 31. Correlator 20 also supplies an output to processing unit 31. The function of circuits 30 is to associate the received signals with a particular type of emitter (based on prior knowledge of the characteristics of various emitters likely to be encountered), and the function of processing unit 31 is to combine this identification datum with a signal from the correlator that indicates the direction of said source. However, details of circuits 30 and processing unit 31 are not within the scope of this invention.

For a signal arriving from a source so located that $\theta = 0$ (i.e., a source located exactly on the antenna axis, which is a line orthogonal to the antenna mount at the midpoint between antennas 10 and 11), the distance traveled by the signal in reaching antenna 10 and passing down the tapped delay line 13 to the channel associated with the midpoint of the line will be the same as the distance traveled in reaching antenna 11 and passing through delay line 21 and the corresponding elements of the reference channel. For the particular position of RF phase shifter 25 when the signal is first received, the phase of the local oscillator signal input to mixer 22 will generally not be the same as that which is inputted to the mixer in said middle channel, and therefore the output of said middle channel and that of amplifier 24 of the reference channel will also generally differ in phase. However, as phase shifter 25 is swept in phase, it will quickly (e.g., within 0.02 seconds) reach a point where the inputs to the above-identified mixers are in phase, and the early portion of the output signal from the middle channel associatd with tapped delay line 13 will exactly match the unblanked portion of signal coming from reference channel amplifier 24. This match will be used by correlator 20, in a manner yet to be described, to determine that the direction arrival of the incoming signal was such that $\theta = 0$.

Similarly, if $\theta = \theta_1$, where $\theta_1$ is an angle such that the phase front of the signal reaching antenna 11 arrives $t_1$ nanoseconds after the same phase front reaches antenna 10, the sweeping of phase shifter 25 will lead to a situation in which identical early portions of signals will occur at the outputs of the reference channel and the tapped delay line channel associated with a coupler on delay line 13 at delay $t_1$ nanoseconds further down the tapped delay line, and this particular matching of output signals can be used by the correlator 20 to indicate that $\theta = \theta_1$. Thus, the system can determine the value of $\theta$ anywhere within the angular limits provided by the particular design; however, it can do so only if there is a tap suitably located on the delay line 13 to provide a channel output that adequately matches the reference channel output for correlation purposes. This in turn leads to a requirement for many taps on the delay line 13 and a corresponding number of equivalent receiver channels, particularly if the distance d in FIG. 2 is large and the angular resolution provided is to be high.

Despite a large number of delay line taps, the spacing between taps will typically be several wavelengths long, and, with a variety of frequencies for the incoming signal, there will be no set relationship between tap spacing on the delay line 13 and the wavelength of incoming signals. Put another way, the avoiding of any such fixed relationship is necessary if the system is to be broadband. (Specifically, in an application of interest it is desired to have the antenna system capable of operation over three octaves or more.) However, since RF phase relationships lead directly to IF phase relationships that carry through to the various channel outputs, it is necessary to have nearly the same RF phase relationships between signal and local oscillator inputs to the respective mixers if channel outputs are to yield a reasonable match. This need is met by phase shifter 25 which essentially allows trying different phase relationships until the proper one is found.

The action of blanking pulse generator 28 via delay line 29 in cutting off the passage of further signal through logarithmic amplifier 23 after the first portion of signal (e.g., 0.1 $\mu$s) has passed, serves two functions: (1) it tends to provide a uniform pulse width to correlator 20, which eases correlator design problems; and (2) it limits the correlation process to the leading portion of an incoming pulse where the timing differences introduced by tapped delay line 13 are significant. As noted in the outset, the present invention is applicable to incoming signals which carry a rapid modulation and are therefore time-correlative. Long pulses from fixed frequency sources tend to settle down to a relatively unmodulated RF signal during the middle portion of the pulse, and the unmodulated portion dilutes the sharpness of correlation that can be associated with the leading edge of a signal. When the incoming signal is a rapidly modulated continuous signal (not pulsed), the blanking action serves to chop the signal into pulses which are readily processed by ensuing circuits that are designed for pulse use.

Figure 6:
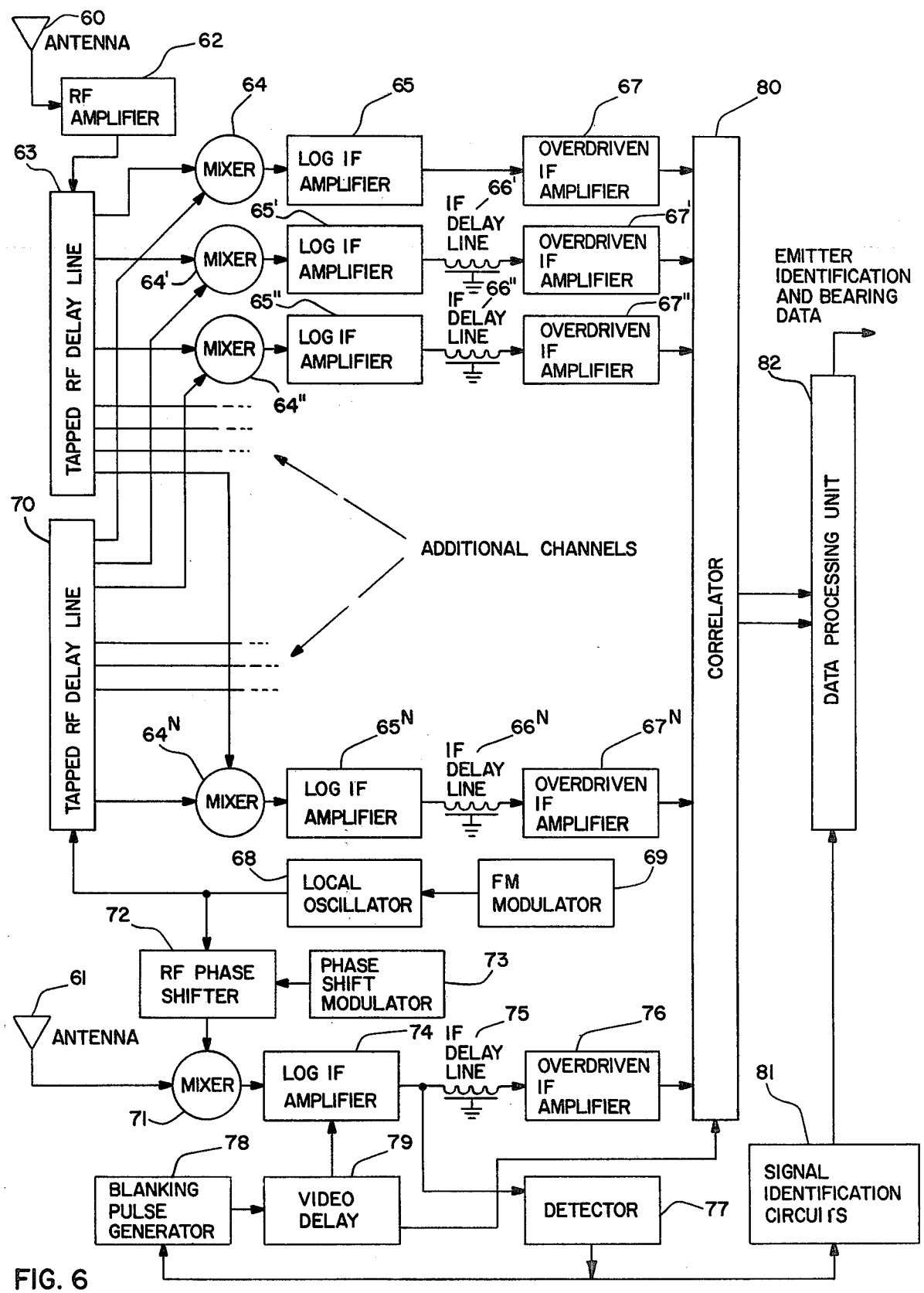
FIG. 6 is a block diagram of another embodiment of the invention.

Another embodiment of the invention, which is set forth in FIG. 6, involves coupling the signal from the local oscillator through a second tapped RF delay line before inputting it into the mixers associated with the receiver channels. In this case, the spacings between couplers in both delay lines will be only half what it would be with only one tapped delay line as in FIG. 4. The embodiment shown in FIG. 6 is essentially a combination of the embodiment of FIG. 4 with a third embodiment (not shown) in which the tapped RF delay line of FIG. 4 is inserted in the local oscillator distribution network rather than in the incoming signal network. The functioning of that third embodiment is similar to the functioning of the FIG. 4 embodiment described above except that IF delays of varying lengths are included in the various amplifier channels.

In FIG. 6, signals are received on antennas 60 and 61. The output of antenna 60 is coupled through an RF amplifier 62 to the input of a tapped RF delay line 63 having multiple output taps thereon. Associated with each output tap is an equivalent receiver channel including mixers $64$–$64^N$. The remaining portion of the receiver channels, including the IF log amplifiers $65$–$65^N$ and overdriven IF amplifiers $67$–$67^N$, function in a manner similar to those set forth in FIG. 4. What are different are the means for introducing the local oscillator and the delays involved. Again, a local oscillator 68 is used that is frequency modulated at an extremely rapid rate by an FM modulator 69, but the local oscillator output reaches mixers $64$–$64^N$ via the aforementioned second tapped RF delay line 70. Delay lines 63 and 70 have the same overall delay and the same uniform spacing between taps. Mixer 64 is connected for receiving an incoming signal with the minimum RF delay and the local oscillator signal with the maximum RF delay, while the connections to mixer $64^N$ are exactly the opposite, and other mixers $64'$–$64^{N-1}$ have intermediate delays as shown by FIG. 6.

For subsequent correlation purposes, it is necessary that the FM applied to the several receiving channels as a result of the local oscillator modulation reach all channel outputs $67$–$67^N$ in the same phase. Therefore, IF delay lines $66'$–$66^N$ are inserted between the logarithmic IF amplifiers $65'$–$65^N$ and the output overdriven IF amplifiers $67'$–$67^N$. IF delay line $66'$ has a delay equal to the difference in delay between the final tap and the next-to-final tap on RF delay line 70, while line $66''$ has a delay equal to the difference between the final tap and the second from the final tap of line 70, and so on. (No delay is introduced between amplifiers 65 and 67 since the final tap of line 70 and the tap that supplies this channel are one and the same.)

The reference channel for the FIG. 6 embodiment comprises antenna 61, mixer 71, RF phase shifter 72, phase shift modulator 73, logarithmic IF amplifier 74, IF delay line 75, overdriven IF amplifier 76, detector 77, blanking pulse generator 78 and video delay line 79. All these elements, with the exception of IF delay line 75, function in the same manner as that described for their counterparts in the FIG. 4 embodiment. IF delay line 75 introduces a delay equal to the total of the delay between the input and middle tap of RF delay line 63 and the IF delay line $66^{N/2}$ that appears in the receiver channel associated with said middle tap. As a result, the signal received through the middle channel associated with antenna 60 matches the signal received through the reference channel when $\theta=0$ as described previously. Remaining elements of the FIG. 6 embodiment are the correlator 80, signal identification circuits 81, and data processing unit 82, each of which can be identical in form and function to its counterpart in FIG. 4.

Use of the embodiment shown in FIG. 6 results in the same type of output as discussed in connection with the embodiment of FIG. 4. For receiver channel mixers near the input end of the tapped delay line 63, the incoming RF signal will have little delay while the local oscillator signal will have much delay due to delay line 70. In a relative sense, the incoming signal at antenna 60 will have a lead over the local oscillator signal from local oscillator 68. At the opposite end of the spectrum, it is the incoming signal that experiences a delay while the local oscillator signal has essentially none and hence the incoming signal appears to lag the local oscillator 68 signal. Halfway down the respective delay lines 63 and 70, both the signal received at antenna 60 and the local oscillator signal from local oscillator 68 have the same delay and have no relative lead or lag. Therefore, for $\theta=0$, the signal supplied to the correlator via the middle receiver channel will correlate properly with a similarly phased reference channel signal which also has no lead or lag. As with the previously described circuit of FIG. 4, the correlation with the middle channel output is used to signify $\theta=0$. Similarly, correlations between the signals of the reference channel and one of the above lead or lag channels signifies particular negative or positive values of $\theta$ respectively.

The embodiment shown in FIG. 6 offers the advantages of (a) a less cumbersome method for distributing the local oscillator signal to the receiver channel mixers and (b) replacement of the matched RF delay line in the reference channel of the embodiment of FIG. 4 by a much smaller and more easily fabricated IF delay.

Figure 7:
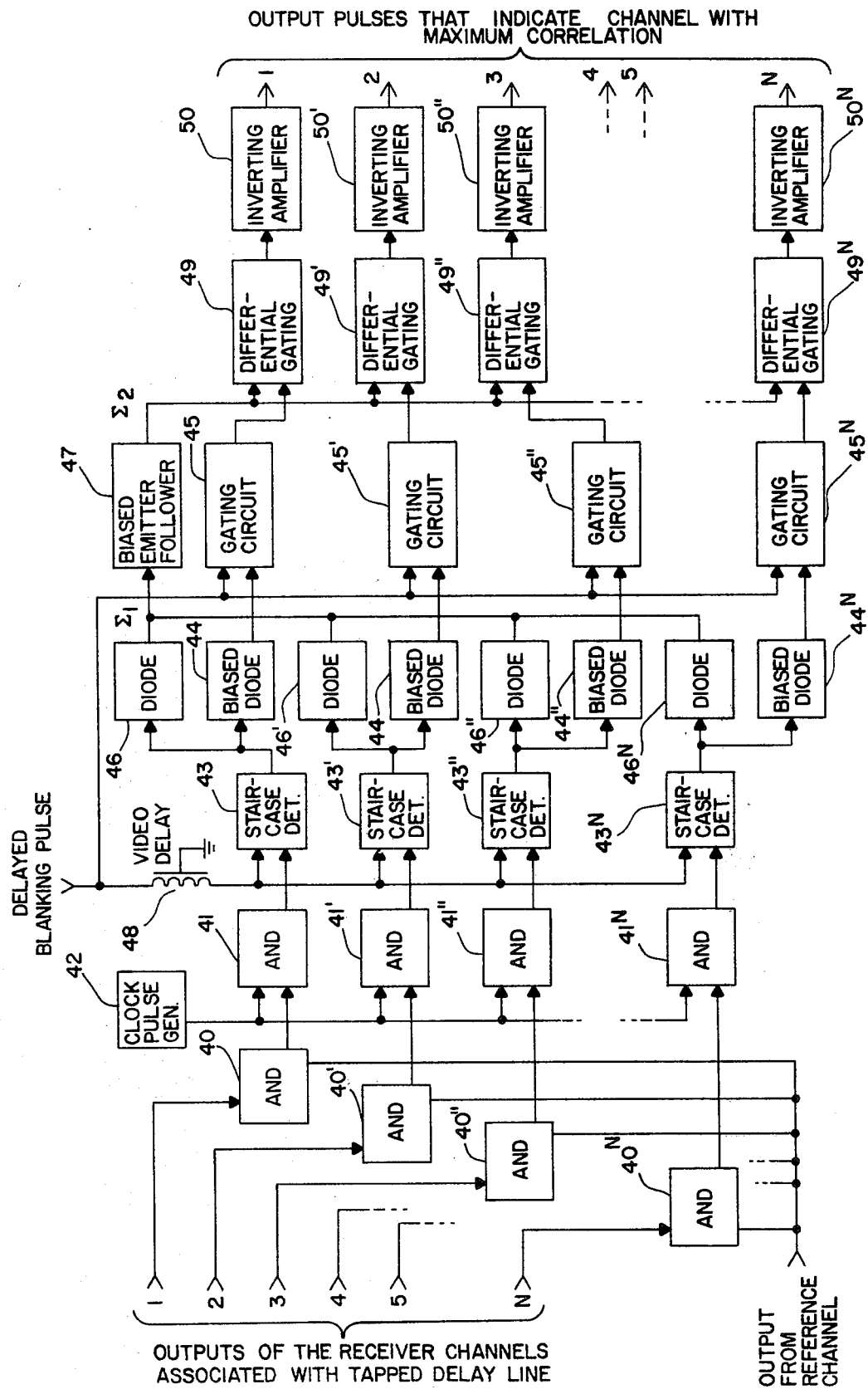
FIG. 7 is a detailed block diagram of a correlator.

A specific embodiment of one type of correlator which might be used is shown in FIG. 7. However, it is to be understood that various correlation techniques might be employed in the correlator portion of the system.

In the correlator of FIG. 7, the output from each of the receiver channels is fed to a corresponding digital AND circuit $40-40^N$. Another input to each of the AND gates is the output from the reference channel. Each AND gate then outputs a signal as long as one of the short pulses comprising the receiver channel output is present simultaneously with one of the short pulses comprising the reference signal output; conversely, when a pulse is present in only one or in neither channel, the AND gate output is zero.

The outputs of the AND gates $40-40^N$ are coupled to a second set of AND gates $41-41^N$. Another input to the AND gates $41-41^N$ is the output of a high frequency clock pulse generator 42. AND gates $41-41^N$ provide a digital ONE for each high frequency clock cycle during intervals when the particular receiver channel and reference channel outputs yield short pulses simultaneously. Since the pulses in each of these receiver channel signals occur with essentially a 50% duty cycle while a received signal is present, a matching or correlation of these signals with appropriate phase synchronization leads to pulse outputs from the second set of AND gates $41-41^N$ for 50% of the clock cycles and this serves as a measure of full correlation. (Parallel circuitry with a NOR circuit in lieu of the first set of AND gates $40-40^N$ could check correlation of the gaps between pulses as well, however due to the symmetrical nature of the signals involved, this is unnecessary). For other receiver channels where the IF frequency does not allow full correlation of the output signal with a reference channel signal, there will be pulse outputs from the AND gates $41-41^N$ for a lower percentage of the clock cycle, with the average being 25% of the clock cycle while a receiver channel signal is present.

The outputs of the AND gates $41-41^N$ are coupled as inputs to respective staircase detectors $43-43^N$, the outputs of which are in turn coupled through respective biased diodes $44-44^N$ to gating circuits $45-45^N$, and are also coupled through diodes $46-46^N$ to a biased emitter follower 47. Another input to the staircase detectors $43-43^N$ comprises a delayed blanking pulse from the video delay circuit 29 of FIG. 4 which is coupled through a short additional delay increment 48. The delayed blanking pulse (without an additional delay increment) is also coupled to gating circuits $45-45^N$.

The outputs of the respective gating circuits $45-45^N$ serve as one of the inputs to each of respective differential gating circuits $49-49^N$. The outputs of the diodes $46-46^N$, after processing by biased emitter follower 47, provide a second input to differential gating circuits $49-49^N$, the outputs of which are in turn coupled through respective inverting amplifiers $50-50^N$. The outputs of the inverting amplifiers $50-50^N$ would then provide the emitter bearing data as determined for each individual pulse or short segment of signal.

The portions of the correlator shown in FIG. 7 following the second set of AND gates $41-41^N$ perform the function of selecting which of the receiver channels provides a signal that correlates best with the signal from the reference channel, with judgement of the degree of correlation based on the number of ONE's appearing in the respective AND gates $41-41^N$. This function begins in each channel with a staircase detector $43-43^N$ that rises one step in output voltage each time that a digital ONE appears at its input. The outputs of all the staircase detectors $43-43^N$ are summed at a common terminal ($\Sigma_1$) after passage through diodes $46-46^N$ which serve to isolate the staircase detectors and keep them functioning independently. The peak signal attained at $\Sigma_1$ is therefore that attained by the staircase detector with the highest output. That signal is passed through a biased emitter follow 47 where the voltage is reduced by a small increment equal to the detected output of a single digital ONE pulse from an AND gate; that is, $\Sigma_2$ equals $\Sigma_1$ minus a single ONE-pulse voltage increment.

Meanwhile, the individual outputs of the staircase detectors $43-43^N$ are also fed to the respective biased diodes $44-44^N$ which are each biased against conduction unless that particular staircase output climbs to a voltage representing an output well over 25% of the clock pulse digital ONE's from the corresponding AND circuit $41-41^N$. That is, the diode biasing serves to reject the average signal with its 25% value as discussed previously, and pass only signals that signify a better match (e.g., 40%) between the respective tapped delay line channel and reference channel outputs. Signals that pass the biased diodes go to respective gating circuits $44-44^N$ which are gated open briefly at the time of occurrence of the delayed reference channel blanking pulse, signifying the end of the correlation period for that particular incoming pulse or portion of received signal. After a very short delay to allow time for functioning of the gating circuits (which can be of either a two-diode or transistor type), the same blanking pulse is applied to the input of the staircase detectors $43-43^N$ as a recycling pulse to return them to zero output for beginning the next modulation and detection cycle. The result is that those outputs of the gating circuits which are not zero (due to failure to exceed the diode bias) are pulses with peak amplitudes equal to the peak outputs of the staircase detectors during the period of reception of the incoming radar pulse or a corresponding portion of a non-pulsed received signal (e.g., a noise jammer signal).

Figure 8:
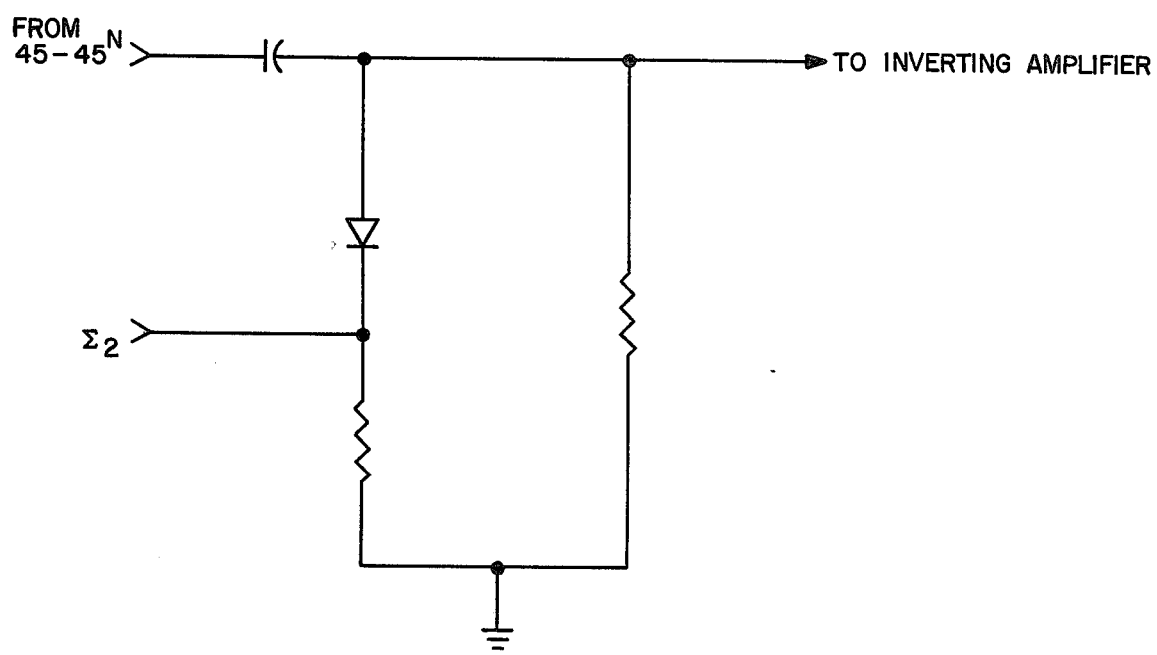
FIG. 8 is a schematic of a differential gating circuit.

The individual gating circuit outputs are each compared to the $\Sigma_2$ signal in respective differential gating circuit $48-48^N$. The differential gating circuit is shown schematically in FIG. 8. Due to the way in which $\Sigma_2$ is derived, the highest amplitude signal of the gating circuit outputs, and only the highest amplitude signal, will exceed the $\Sigma_2$ signal by one voltage increment. This increment will cause the capacitor shown in FIG. 8 to accumulate a charge for that particular channel, which charge will result in a negative voltage appearing at the differential gating circuit output when the input pulse to that circuit falls away. This charge will then leak off during the next modulation cycle, but not until it has caused a positive signal with an exponentially decaying trailing edge to appear at the output of the following inverting amplifier. The positive signal outputted from the inverting amplifier is then the output of the correlator, and, as brought out previously, the particular receiver channel with which it is associated is indicative of the angle of arrival ($\theta$) of the particular radar pulse involved.

As was mentioned previously, the RF and hence the IF signals in any one tapped delay line channel will generally be out of phase with the corresponding signal in the reference channel, but periodically (e.g., 50 times a second) the respective signals will be brought into phase through the action of RF phase shifter 25. When the phases are approximately equal (i.e., for 10 to 20% of the time), the in-phase relationship will lead to the stated correlator output for each received pulse. When the phases are substantially different, the proper channel will fail to give a correlator output. When the proper channel does not respond, there may be no correlator output for that particular incoming pulse, or, from time to time, there may be a random response from any one of the other channels. However, (1) the asynchronous relationship between the incoming signal pulse repetition frequency (prf) and the modulation applied to local oscillator 17, and (2) the functioning of the biased diodes $44-44^N$ in the correlator, will statistically assure that false outputs from a given channel rarely occur for a number of consecutive incoming pulses. Thus, the proper correlation stands out well above the background of occasional and random false correlations.

Now referring back to FIG. 4, the output of the correlator 20 is illustrated as feeding a data processing unit 31. The operation of the data processing unit 31 will depend to a large extent on the type of overall function with which the direction finding system is involved and does not form part of the present invention. In FIG. 4, the reference channel is used to supply an IF signal to the detector 27 and signal identification circuits 30 of the general type associated with electronic intelligence (ELINT) and electronic countermeasures (ECM) equipments. Again, such circuits do not form part of the present invention and are not shown in any great detail. However, be it sufficient to say that such circuits serve to identify signals received by recognizing characteristics (e.g., frequency, prf, and pulse width) as those known to be associated with a particular emitter (e.g., the seeker of an enemy cruise missile). With a given received signal identified in this manner as coming from a particular type of emitter, and with the direction of the emitter of that signal simultaneously indicated by the correlator 20, the data processor 31 associates the two by their timing and provides appropriate data outputs to alert an operator, activate defenses or carry out other intended functions. The real time operation of the correlator (i.e., providing an output relative to a particular incoming pulse as it is received) enables the passive radar direction finding system to handle intermixed signals from a number of different emitters concurrently.

Another function of the data processor will generally be to observe the output of the correlator over a number of radar pulse cycles and not give an output until the angle measurement is well confirmed. This reduces the "false alarm" rate without introducing an objectionable time delay, since radar pulse repetition frequencies (prf's) are generally high compared to direction finding response demands. Circuits for this confirmation function within the processing unit can be lower frequency versions of the staircase detectors and related circuits discussed in connection with the correlator of FIG. 7. Moreover, by integrating results over a number of incoming pulse cycles, the processing unit can provide an approximate vernier on the directional information beyond that available to the delay line tap spacing. Thus, an emitter that yields maximum correlation in one channel half the time and in an adjacent channel the other half of the time may be judged to be located at an angle halfway between.

As compared to passive radar direction finding systems using narrow band antenna beams or antenna nulls, the present invention has the feature of operating with two or more individually small antenna elements that need not be scanned. Aside from the obvious installation advantages, this means that the disclosed system essentially "sees" in many directions simultaneously and can find directions within a few pulses before a scanned system could be brought into angular alignment. This helps counter the practice of "quick looks" by an unfriendly emitter. As compared to interferometer systems, the disclosed system has the advantages of providing an angular measurement that (a) is not dependent on the particular frequency of the incoming signal, (b) is unambiguous, and (c) can function with incoming signals that are chirped (i.e., intrapulse frequency modulated). By adding additional antennas or other complexities, an interferometer system might avoid the ambiguity problem but it would then be disadvantegous in terms of complexity.

Another embodiment of the invention (not illustrated) includes high-microwave-band tuners that are inserted in the FIG. 4 embodiment directly following each of the two antennas. The tuners, which must share a common local oscillator (or local oscillators), down-convert the incoming signal frequency to one that is compatible with RF delay lines 13 and 21 and with local oscillator 17 (which then becomes the second local oscillator in a double-superheterodyne system). This provides the multiband operation previously mentioned.

Still another alternative construction (not shown) is to include a third antenna with the pair previously discussed, but located on a baseline orthogonal to the antenna mount line shown in FIG. 1 so as to give a vertical angular measurement concurrently with the previously described azimuth measurement. The two measurements could share use of the same reference antenna and reference channels.

I claim:

1. A passive direction finding system comprising;
at least one set of spaced apart antennas;
delay means operatively connected to the output of one of said at least one set of antennas and having a plurality of output taps thereon;
mixer means operatively associated with each of said output taps on said delay means and receiving an output therefrom;
oscillator means for producing an output signal at the output thereof;
said mixer means also operatively receiving the output signal from said oscillator means;
signal conditioning means operatively associated with said mixer means and receiving the output therefrom for amplifying and clipping the output of said mixer means;
said signal conditioning means and said mixer means being instrumented so that they are equivalent in number to the number of output taps on said delay means and correspond to a predetermined number of channels;
other mixer means operatively coupled to the output of the other of said at least one set of antennas and receiving the output therefrom;
said other mixer means also receiving an output signal from said oscillator means;
other signal conditioning means operatively coupled to the output of said other mixer means for amplifying and clipping the output of said mixer means;
said other mixer means and other signal conditioning means being instrumented so that they correspond to a reference channel;
and correlator means operatively coupled to said signal conditioning means and said other signal conditioning means for determining the correlation between signals present in said channels and said reference channel.

2. A passive direction finding system as set forth in claim 1 wherein;
said signal conditioning means comprises an amplifier and overdriven amplifier and additional delay means in series between said amplifier and said said overdriven amplifier.

3. A passive direction finding system as set forth in claim 1 wherein said correlator means comprises;
a plurality of coincidence means having inputs and outputs therefrom;
one of the inputs to said coincidence means comprising the output of said reference channel;
another input to said coincidence means comprising the output of the receiver channels wherein channel 1 is coupled to one of said coincidence means, channel 2 is coupled to another said coincidence means, channel 3 is coupled to another said coincidence means, etc.;
another plurality of coincidence means having inputs and at least one output therefrom;
said other plurality of coincidence means receiving inputs from a clock pulse generator;
said other coincidence means being operative to produce an output pulse therefrom when an input from the pulse generator and an output from one of said first mentioned coincidence means coincides at the input thereto;
detector means operatively associated with each of said other coincidence means for detecting the presence of a predetermined number of output pulses from said other coincidence means;
said detector means having an output which is coupled to the input of a gating circuit;
the number of gating circuits being equal in number to the number of detector means;
each of said gating circuits being biased such that the output of said detector means having the largest signal will be gated therethrough; and
indicating means coupled to the output of said gating means for indicating the channel on which the largest signal has appeared.

4. A passive direction finding system as set forth in claim 1 and further including;
another delay means operatively connected between said oscillator means and said mixer means;
said another delay means having a plurality of output taps equal in number to the number of mixer means.

5. A passive direction finding system as set forth in claim 4 wherein;
said signal conditioning means comprise an amplifier and overdriven amplifier; and
additional delay means in series between said amplifier and said overdriven amplifier.

6. A passive direction finding system as set forth in claim 2 wherein;
said other signal conditioning means comprises an amplifier and overdriven amplifier and further delay means in series between said amplifier and overdriven amplifier.

7. A passive direction finding system as set forth in claim 1 and further including;
frequency modulating means operatively connected to said oscillator means for frequency modulating the output signal of the oscillator.

8. A passive direction finding system as set forth in claim 1 and further including;
phase shifter means having an input and operatively connected between the output of said oscillator means and the other mixer means; and
phase shift modulator operatively connected to the input of said phase shifter means for causing said phase shifter to sweep between 0° and 360°.

9. A passive direction finding system as set forth in claim 6 and further including;

detector means having an input operatively coupled to the output of said amplifier which comprises part of said other signal conditioning means and having an output;

blanking pulse generator means having an input and output; and said input operatively receiving an output from said detector means;

the output of said blanking pulse being coupled as an additional input to said amplifier forming part of said other signal conditioning means and also forming an additional input to said correlator means.

* * * * *